UNITED STATES PATENT OFFICE.

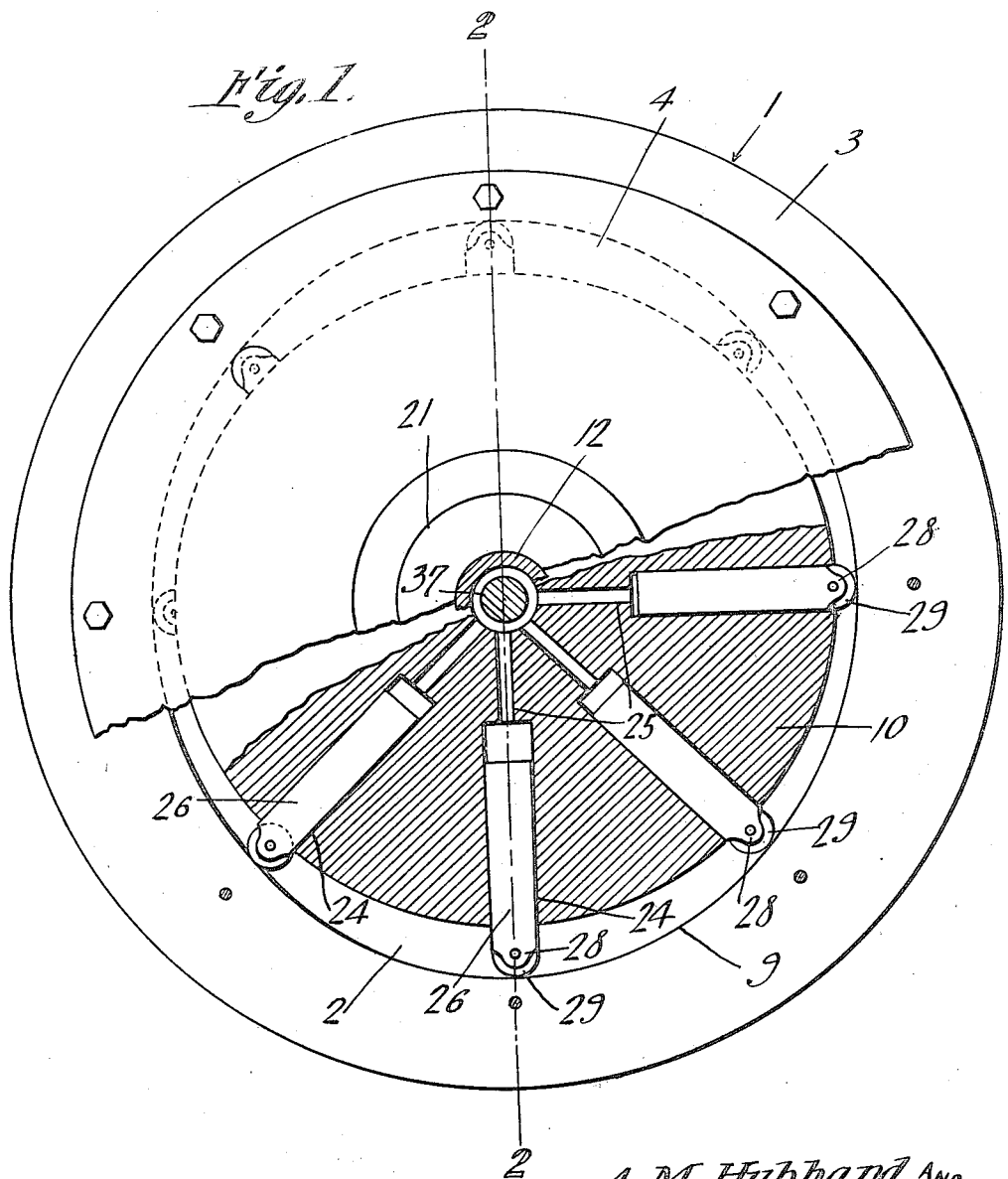

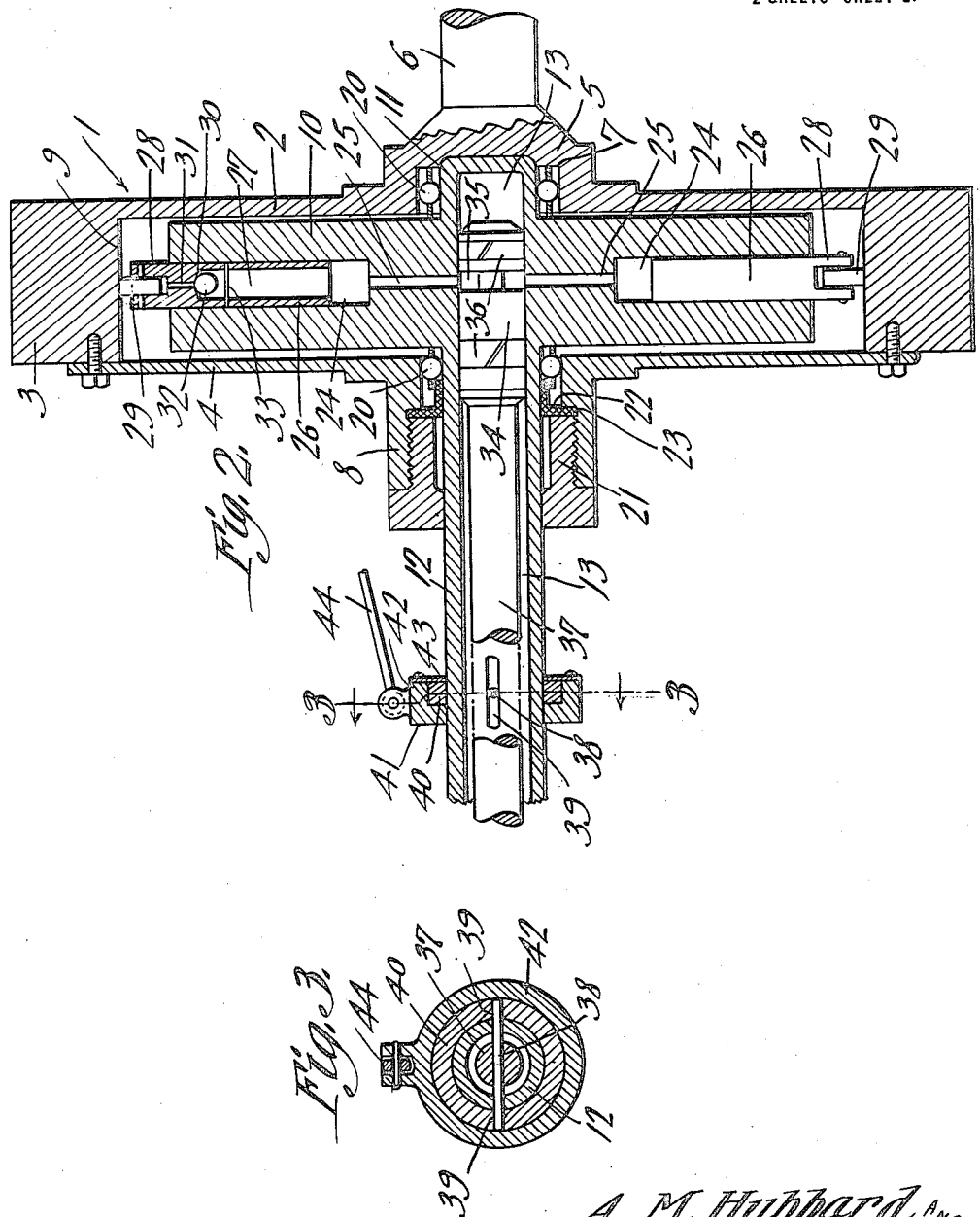

ADRA M. HUBBARD AND OSCAR M. HUBBARD, OF PLAINVIEW, TEXAS, ASSIGNORS OF ONE-HALF TO MORGAN C. WOLFE AND ONE-SIXTH TO H. L. BATTLE AND W. E. HUBBARD, ALL OF DALLAS, TEXAS.

CLUTCH AND TRANSMISSION DEVICE.

1,227,910.      Specification of Letters Patent.      Patented May 29, 1917.

Application filed April 18, 1916. Serial No. 91,972.

*To all whom it may concern:*

Be it known that we, ADRA M. HUBBARD and OSCAR M. HUBBARD, citizens of the United States, residing at Plainview, in the county of Hale, State of Texas, have invented a new and useful Clutch and Transmission Device, of which the following is a specification.

The present invention appertains to clutches and transmission devices, and aims to provide a device of that character adapted for use upon automobiles, although useful for many other purposes, and which is operable for connecting the driving and driven elements in a thoroughly efficient manner, obviating the objections incident to ordinary friction and similar clutches.

The present device is also operable to vary the speed at which the driven element is rotated relative to the driving element, whereby in some cases the present device can supplant both the clutch and transmission mechanism of an automobile or other machine, while in other cases can be used in conjunction with a suitable transmission mechanism for changing the direction of rotation and for use in emergency conditions.

It is also the object of the invention to provide a clutch and transmission device which is simple, compact and inexpensive in construction, and which is thoroughly practical, reliable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is an elevation of the device, portions being broken away and shown in section.

Fig. 2 is a diametrical section taken on the line 2—2 of Fig. 1, portions being broken away and others shown in elevation.

Fig. 3 is a sectional detail taken on the line 3—3 of Fig. 2.

In carrying out the invention, there is provided a tubular casing 1, which provides or is preferably used as the fly wheel of the engine, and said casing includes a disk or side plate 2 provided at its margin with a rim 3 to which is bolted or otherwise attached the opposite side plate or disk 4. The plate or disk 2 has a central outstanding hub member 5 to which is attached the shaft or driving element 6 which is rotated by the engine or other prime mover. The hub member 5 has an inner socket 7, and the plate 4 has a central outstanding tubular hub member 8. The inner surface of the rim 3 is elliptical to provide a cam surface 9.

Mounted for rotation within the casing 1 is a circular or disk-shaped member 10, and this disk or member 10 is provided at one side with a central outstanding trunnion or gudgeon 11 mounted for rotation within the socket 7. The disk 10 is provided at its opposite side with a central axial tubular shaft 12 projecting therefrom and constituting the driven element. The bore 13 of the shaft 12 extends through the disk 10 and into the trunnion 11. Anti-frictional balls 20 are disposed between the trunnion 11 and walls of the socket 7, and between the shaft 12 and walls of the hub member 8, to reduce friction, and to permit the casing or fly wheel 1 and disk 10 to rotate readily relative to one another. Threaded or otherwise engaged within the hub 8 is a gland 21 for holding an angular packing member 22 within the member 8, said member 8 having a shoulder 23 against which the packing 22 is held seated by the gland 21. The packing 22 embraces the shaft 12 to prevent the leakage of the oil with which the casing 1 is filled, although any other suitable fluid can be used.

The disk 10 is provided with radial bores 24 extending to its periphery, and with reduced bores or passages 25 extending from the inner ends of the bores 24 to the bore 13, said bores all being disposed in a common plane. Slidably mounted for radial movement within the bores 24 are plungers 26, which are provided with bores or recesses 27 extending from their inner ends to points between the ends of the plungers. The outer ends of the plungers which project from the periphery of the disk 10 are bifurcated, as at 28, and have pivoted therein rollers 29 which bear against the cam surface 9. The plungers 26 have valve seats 30 at the outer ends of the bores 27, and apertures 31 extending from the valve seats to the bifurcations 28 to communicate with the space between the disk 10 and casing 1. Ball valves 32 are seatable against the seats 30 by outward movements, and are held adjacent said seats by pins 33 engaged through the plungers, whereby to prevent the valves from moving too far away from their seats.

Mounted for sliding movement within the bore 13 is a piston valve 34 having an annular groove 35 between its ends for coöperation with the bores or passages 25, and said valve 34 has packing rings 36 at opposite sides of the groove 35 to prevent leakage past the ends of the valve 34. The valve 34 is provided with a stem 37 projecting from one end into the tubular shaft 12, whereby the valve 34 can be adjusted.

The adjustment of the valve 34 is accomplished by a diametrical pin 38 engaged through the stem 37 and working in opposite longitudinal slots 39 with which the shaft 12 is provided, the terminals of said pin being engaged within a collar or ring 40 slidable upon the shaft 12. This ring 40 rotates with the shaft 12 and the valve 34 and its stem also rotates with said shaft and disk 10. As a means for shifting the ring 40 longitudinally of the shaft 12, a ring 41 is mounted loosely upon the shaft 12 and has a flange 42 overlapping the ring 40, and an annular plate or ring 43 is secured to the flange 42 at the opposite side of the ring 40. Thus, when the ring 41 is slid upon the shaft 12, the ring 40 will be slid likewise to shift the valve 34 longitudinally. The ring 41 can be connected by means of a link, rod or equivalent element 44 with a hand lever, foot treadle, or other operating member, to control the valve 34 properly.

Assuming that the casing 1 is filled with oil or equivalent liquid, with the valve 34 arranged as seen in Fig. 2, so that the passages 25 communicate with the groove 35, the oil is free to flow between the passages 25 by way of the groove 35 into and out of the bores 24 as the plungers 26 are reciprocated by their engagement with the cam surface 9 as the casing 1 is rotated. This free circulation of the oil between the plungers, lets the disk 10 remain in idle or passive condition, whereby to disconnect the driven element from the driving element. Now, by moving the valve 34 so that it closes the passages 25, the oil can no longer flow through the passages 25, and when the plungers are forced inwardly by the cam surface 9, the oil within the bores 24 back of the valves 32 will be compressed, said valves being seated, and this compression or resistance offered by the oil or fluid, will prevent the inward movement of the plungers 26 beyond a limited amount, whereby it is now necessary for the disk 10 to rotate with the casing 1, thus rotating the driven element at the same speed as the driving element. Thus, by simply controlling the valve 34, the driven element can be readily connected to and disconnected from the driving element.

When it is desired to have the driven element rotate at a slower velocity than the driving element, the valve 34 is moved so that its groove 35 will only partially register with the passages 25, thereby providing for a restricted flow of the oil between the passages 25, which impedes the movement of the plungers 26. Thus, when the plungers are forced inwardly, the flow of oil from the bores 24 will be impeded, since the valve 34 is partially closed, and the inward movement of the plungers being subjected to this resistance, will cause the disk 10 to rotate, but with a slower velocity than the casing 1. Thus, the plungers 26 can reciprocate, but not freely, whereby the casing 1 can rotate faster than the disk 10, but the resistance offered by the plungers causes the disk 10 to be rotated with but slower than the casing. By adjusting the valve 34, the speed at which the disk 10 and shaft 12 are rotated can be controlled, to provide for various speeds. The present device can therefore be used as a transmission mechanism, in addition to a clutch.

The present device is characterized by its ease of operation, the simplicity of control, the absence of a jerking or jarring action as with friction and similar clutches, and the smoothness with which it works. The present device enables the load to be taken up gradually, and at the same time, positively with no danger of the clutch heating or "grabbing". This device, without jerk or jar or loss of power, transmits at a proportional rate of speed, all power developed at any given engine speed, thereby enabling the power to move the load or to start the load at the slowest speed. The invention has other advantages which will be obvious from the foregoing, taken in connection with the drawings.

Having thus described the invention, what is claimed as new is:

1. A clutch and transmission device comprising a rotatable fluid-containing casing, a rotatable member therein having a tubular shaft projecting from one side through one side of the casing, said member having radial bores communicating with the bore of said shaft, a piston valve slidable in the bore of said shaft and having a stem projecting therein, said valve having an annular groove coöperable with the radial bores, plungers working in said radial bores and having bores communicating therewith and communicating with the space between said member and casing, the casing having means for moving said plungers when said member and casing are rotated relative to one another, and valves carried by said plungers, for preventing the flow of fluid therethrough in one direction.

2. A clutch and transmission device comprising a casing having side plates and a rim, said rim having an inner cam surface, a disk rotatable within the casing having a trunnion at one side mounted for rotation in one side plate, said disk having a tubular shaft projecting from its other side through the other side plate of the casing, the bore of said shaft extending into said disk, said disk having radial bores extending to its periphery and reduced bores extending from said radial bores to the first mentioned bore, a piston valve slidable within the first mentioned bore and having a stem projecting within said tubular shaft, said piston valve having an annular groove coöperable with the reduced bores, plungers slidable in said radial bores and having portions at their outer ends to bear against said cam surface, the plungers having bores communicating with the radial bores and with the space between said disk and casing, said plungers having valve seats, and outwardly seating valves coöperable with said valve seats.

In testimony that we claim the foregoing as our own, we have hereto affixed our signatures in the presence of two witnesses.

ADRA M. HUBBARD.
OSCAR M. HUBBARD.

Witnesses:
W. W. KIRK,
H. E. ELLIOTT.